(12) United States Patent
Sugio et al.

(10) Patent No.: US 8,087,221 B2
(45) Date of Patent: Jan. 3, 2012

(54) MOWER UNIT WITH WASHING DEVICE SUSPENDED FROM A GRASS MOWER

(75) Inventors: Akihito Sugio, Kakogawa (JP); Akira Minoura, Osaka (JP); Yoshikazu Togoshi, Osaka (JP); Eiji Satou, Sakai (JP); Takahiro Shiraga, Sakai (JP); Kazuo Koike, Kobe (JP); Motosumi Shiotsuki, Sakai (JP); Yusuke Shoji, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 12/872,002

(22) Filed: Aug. 31, 2010

(65) Prior Publication Data

US 2011/0232250 A1    Sep. 29, 2011

(30) Foreign Application Priority Data

Mar. 29, 2010  (JP) ................................. 2010-076031

(51) Int. Cl.
*A01D 19/00* (2006.01)
(52) U.S. Cl. ............................................................. 56/16.8
(58) Field of Classification Search ................... 56/16.8, 56/12.1, 320.1; 239/310, 413
See application file for complete search history.

(56) References Cited

U.S. PATENT DOCUMENTS

| | | | | | |
|---|---|---|---|---|---|
| 1,752,823 | A | * | 4/1930 | Walker | 239/590.3 |
| 2,504,416 | A | * | 4/1950 | Hileman | 56/12.2 |
| 2,936,563 | A | * | 5/1960 | Blume | 56/12.1 |
| 2,984,061 | A | * | 5/1961 | Stabnau | 56/320.1 |
| 2,992,524 | A | * | 7/1961 | Stabnau | 56/320.1 |
| 3,040,990 | A | * | 6/1962 | Gotti | 239/273 |
| 3,214,893 | A | * | 11/1965 | Griffin | 56/320.2 |
| 3,490,212 | A | * | 1/1970 | Hengesbach | 56/16.8 |
| 3,535,862 | A | * | 10/1970 | Wittwer | 56/17.5 |
| 5,027,590 | A | * | 7/1991 | Stark | 56/12.1 |
| 5,189,869 | A | * | 3/1993 | McBride et al. | 56/17.5 |
| 5,444,967 | A | * | 8/1995 | Meuth | 56/12.1 |
| 5,499,492 | A | * | 3/1996 | Jameson | 56/12.1 |
| 6,145,288 | A | * | 11/2000 | Tamian et al. | 56/16.8 |
| 6,260,340 | B1 | * | 7/2001 | Sanner | 56/16.8 |
| 6,497,088 | B1 | * | 12/2002 | Holley | 56/16.8 |
| 6,581,363 | B1 | * | 6/2003 | Hall | 56/12.1 |
| 6,808,126 | B1 | * | 10/2004 | Dunlap | 239/172 |
| 6,910,320 | B1 | | 6/2005 | Thorman et al. | |
| 6,912,834 | B2 | * | 7/2005 | Kasanic et al. | 56/16.8 |
| 2002/0170281 | A1 | * | 11/2002 | Brown | 56/12.1 |
| 2003/0101702 | A1 | * | 6/2003 | Hall | 56/16.8 |
| 2008/0010962 | A1 | * | 1/2008 | Iannello | 56/229 |

* cited by examiner

*Primary Examiner* — Arpad Fabian-Kovacs
(74) *Attorney, Agent, or Firm* — The Webb Law Firm

(57) ABSTRACT

A mower unit includes a mower deck mounting therein in parallel layout first, second and third rotary blades rotatably driven about vertical axes and a washing device. The mower deck includes a top wall, side walls and first, second and third auxiliary side walls for evacuation. The washing device includes a single water supplying unit disposed upwardly of the top wall for supplying washing water and first, second and third water discharging units disposed through the first, second and third auxiliary side walls for discharging water to the first, second and third rotary blades respectively. The washing device includes also a water supplying pipe unit interconnecting and communicating the water supplying unit to the first, second and third water discharging units. The water supplying pipe unit is disposed within a mower deck rear space delimited by outer faces of the first, second and third auxiliary side walls.

6 Claims, 8 Drawing Sheets

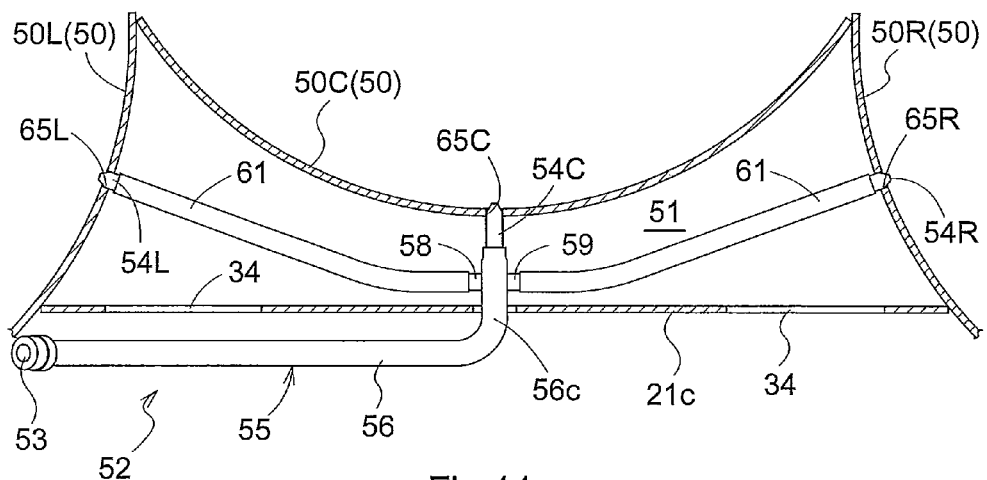
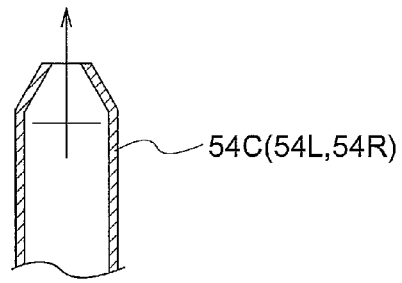
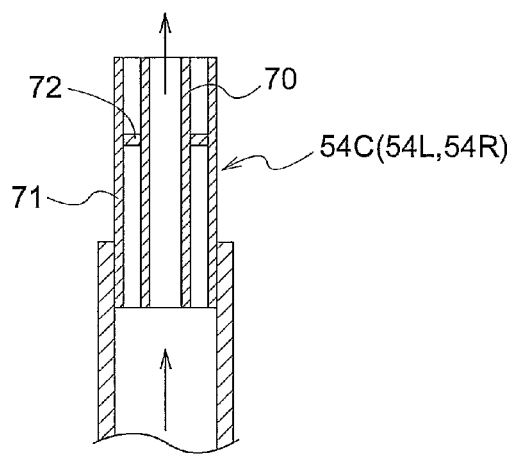

MOWER UNIT WITH WASHING DEVICE SUSPENDED FROM A GRASS MOWER

BACKGROUND OF THE INVENTION

1. Field of the Invention

The present invention relates to a mower unit suspended from a grass mower, more particularly to washing/cleaning of the mower unit.

2. Description of the Related Art

A mower unit incorporating a washing device is known from U.S. Pat. No. 6,910,320. Referring to the washing device used therein, "[the] washing device is provided for removing debris from an underside of a mower having a multi-chamber cutting deck. The device includes a mounting apparatus allowing the device to be attached to a flange of the deck. Connected to the mounting apparatus is an assembly for dispersing liquid such as water and delivering the water to all portions of the underside of the deck."

SUMMARY OF THE INVENTION

An object of the present invention is to provide a mower unit incorporating a washing device capable of washing/cleaning conveniently and effectively the entire inner surface of the mower deck and the entire rotary blades.

For accomplishing the above-noted object, according to the present invention, there is provided a mower unit to be suspended from a machine body of a grass mower, the mower unit comprising:

a mower deck mounting therein in parallel layout first, second and third rotary blades rotatably driven about vertical axes, said mower deck including:
  a top wall,
  side walls, and
  first, second and third auxiliary side walls for evacuation, each of the auxiliary side walls having a shape thereof extending along at least a rear portion of a rotary path of the rotary blade associated therewith; and
a washing device including:
  a single water supplying unit disposed upwardly of the top wall for supplying washing water,
  a first water discharging unit disposed through said first auxiliary side wall for discharging water to said first rotary blade,
  a second water discharging unit disposed through said second auxiliary side wall for discharging water to said second rotary blade,
  a third water discharging unit disposed through said third auxiliary side wall for discharging water to said third rotary blade, and
  a water supplying pipe unit interconnecting and communicating the water supplying unit to the first, second and third water discharging units, said water supplying pipe unit being disposed within a mower deck rear space delimited by outer faces of said first, second and third auxiliary side walls;
wherein said first, second and third water discharging units are configured to discharge the washing water in such a manner that a center flow portion of the discharged water respectively therefrom is confined within an inner space of the mower deck.

As the water supplying unit is disposed upwardly of the top wall, a worker can readily effect an operation of e.g. connecting a water supplying hose or the like to this water supplying unit from the lateral side thereof. As the first, second and third water discharging units are disposed through the first, second and third auxiliary side walls that form some portions of the grass cutting space, it is possible to align and focus the flow center of the amount of washing water discharged from each discharging unit within the inner space of the mower deck in a reliable manner. With these combined, there is realized effective washing/cleaning of the inner surface of the mower deck and the rotary blades (removal of cut grass debris, mud, etc.). Further, as the water supplying unit is disposed in the mower deck rear space delimited by the outer faces of the first, second and third auxiliary side walls, this water supplying unit can hardly be subjected to an interference from the outside.

If each of the first, second and third water discharging units is disposed upwardly of the rotary path of the rotary blade associated therewith, the washing water will be discharged to the rotary blade from above. So, as compared with the arrangement of water being discharged to the rotary blade from its underside, the inner surface of the mower deck and the entire rotary blades can be washed and cleaned in an efficient manner.

If the mower deck is suspended and supported from the machine body to be liftable up/down via at least one pivot arm, the water supplying unit can disposed between a top wall of the mower deck and the pivot arm. And, the distance between the pivot arm and the water supplying unit when the mower deck is set under a working posture will be greater than the distance between the same when the mower deck is set under a non-working posture. That is, e.g. a connecting operation for connecting a water supplying hose or the like to the water supplying unit becomes easier when the mower deck is set under the working posture than when the deck is set under the non-working posture. Further, for reducing the amount of scattering of washing water, it is preferred that the mower deck be set under the working posture (near-ground posture). Therefore, the above arrangement of facilitating the connecting operation of the water supplying hose when the mower deck is set under the working posture is advantageous.

The water supplying pipe unit may include a main water supplying pipe connected to the water supplying unit, a first auxiliary water supplying pipe for connecting the main water supplying pipe to the first water discharging unit, a second auxiliary water supplying pipe for connecting the main water supplying pipe to the second water discharging unit, and a third auxiliary water supplying pipe for connecting the main water supplying pipe to the third water discharging unit. In this case, the water supplying unit may be shaped and dimensioned such that the flow rates and pressures of the washing water from the first, second and third water discharging units be substantially equal to one another. One possible measure to realize this is to provide a reduced diameter portion at an appropriate position in the main water supplying pipe. With this, due to the resistance provided by this reduced diameter portion, it becomes possible to prevent uneven water distribution of a branch water supplying pipe positioned closest to the water supplying unit being supplied with water preferentially.

BRIEF DESCRIPTION OF THE DRAWINGS

FIG. 10 is a plan view of a washing device relating to the still further embodiment,
FIG. 11 is a plan view in section showing a water discharging unit relating to the still further embodiment,
and FIG. 12 is a plan view in section showing a water discharging unit relating to a still yet further embodiment.

DETAILED DESCRIPTION OF THE PREFERRED EMBODIMENTS

Preferred embodiments of the present invention will be described next with reference to the accompanying drawings.
[Riding Type Grass Mower]

Figure 1:
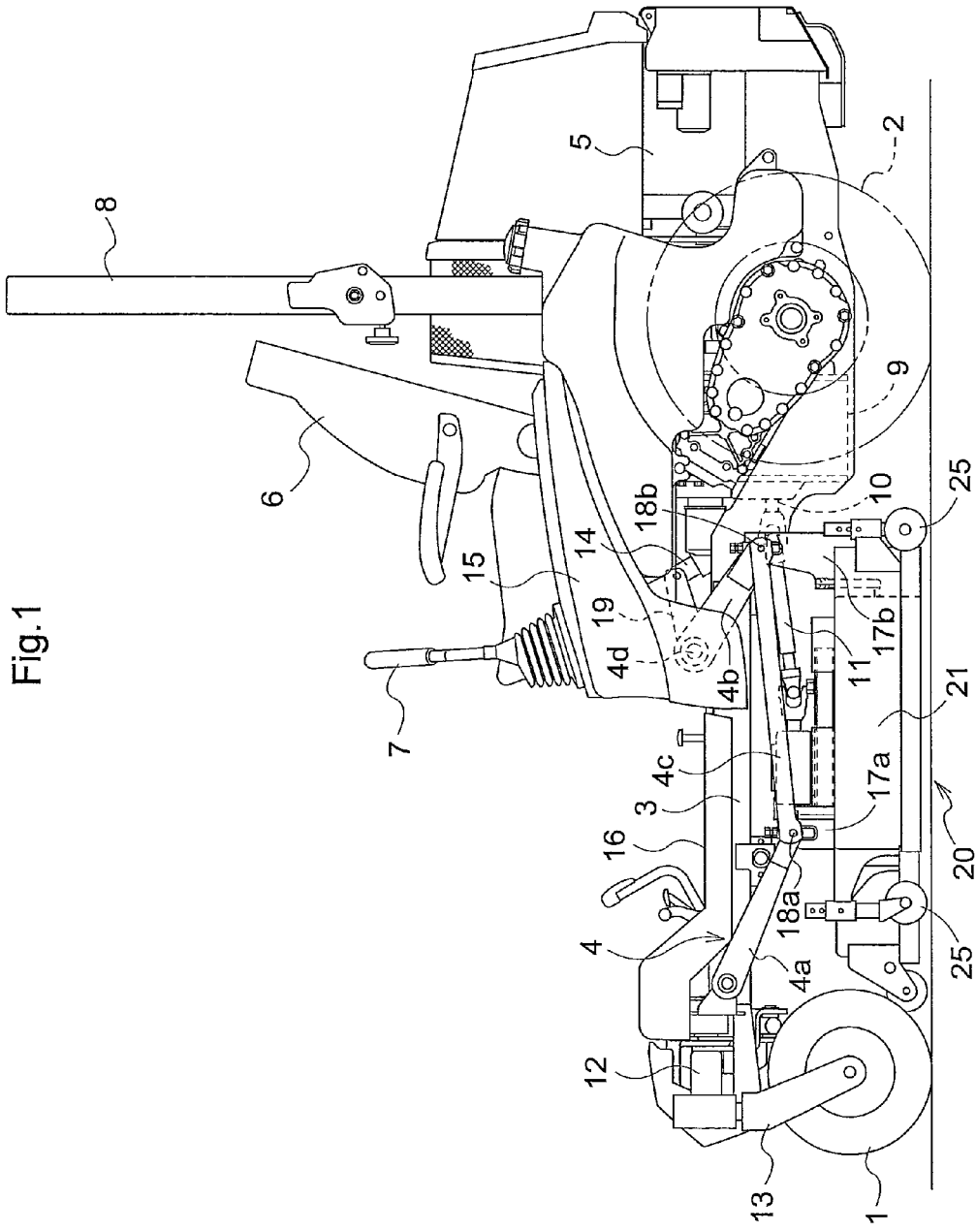
FIG. 1 is an overall side view of a riding type grass mower.
Figure 2:
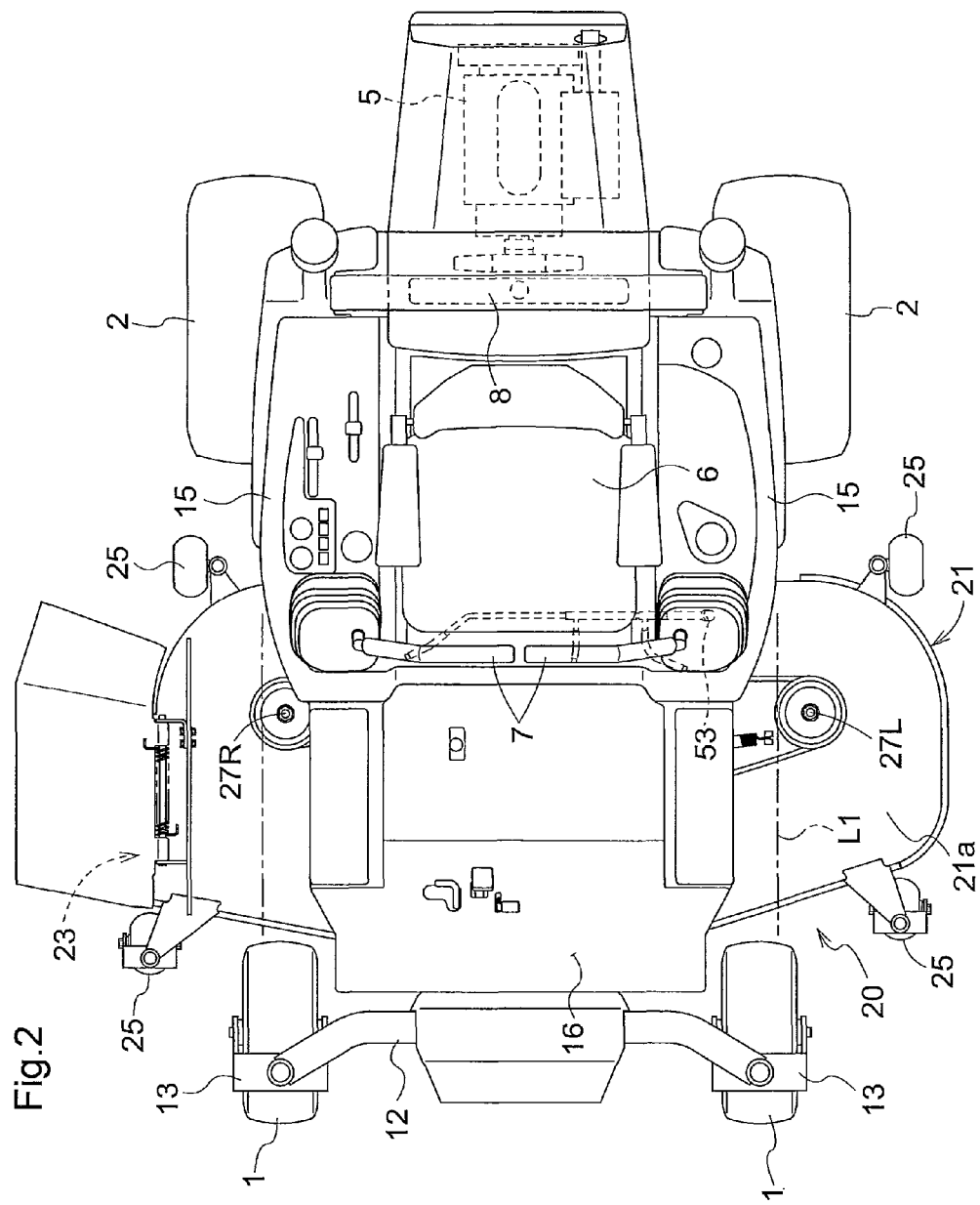
FIG. 2 is an overall plan view of the riding type grass mower.

As shown in FIG. 1 and FIG. 2, a riding type grass mower relating to the present invention includes: a vehicle body frame 3 acting as a machine body (vehicle body) supported on the ground surface via a pair of right/left front wheels 1, 1 and a pair of right/left rear wheels 2, 2; and a side-discharge type mower unit 20 (simply referred to as "mower unit 20" hereinafter) suspended from the vehicle body frame 3, i.e. from the underside of a driving section floor 16 between the front wheels 1 and the rear wheels 2, via a link mechanism 4.

The grass mower includes an engine section having an engine 5 mounted at a rear portion thereof; a driving section including a driver's seat 6 and a pair of right/left maneuvering levers 7, 7; a ROPS (roll-over protection system) frame 8 disposed adjacent a rear side of the driver's seat 6; a transmission device 9 supporting the right/left rear wheels 2, 2; and a rotary shaft 11 for transmitting a drive force from a PTO (power takeoff) shaft 10 mounted at a front portion of the transmission device 9 to a rotary blade driving mechanism 30 of the mower unit 20.

The right/left front wheels 1 are supported at ends of a front wheel support frame 12 which is connected to the front portion of the vehicle body frame 3, via front wheel support forks 13 to be pivotable about respective vertical axes. Whereby, the right/left front wheels 1, together with the front wheel support forks 13, can pivot freely relative to the front wheel support frame 12. The right/left rear wheels 2, 2 are independently driven by a pair of hydrostatic stepless speed changers (not shown) included in the transmission device 9 and speed-changed to the forward traveling side or to the reverse traveling side, or stopped by separate speed-changing operations of the pair of hydrostatic stepless speed changers by the right/left maneuvering levers 7, 7.

The link mechanism 4 includes: a pair of right/left front pivot links 4a, 4a connected between the vehicle body frame 3 and a front end of a mower deck 21 of the mower unit 20, and operably coupling the front end portion of the mower unit 20 to the vehicle body frame 3 to lift the former up/down relative to the latter; a pair of right/left rear pivot links (pivot arms) 4b, 4b connected between the vehicle body frame 3 and a rear end of the mower deck 21, and operably coupling the rear end portion of the mower unit 20 to the vehicle body frame 3 to lift the former up/down relative to the latter; and coupling links 4c, 4c connected between the front pivot links 4a, 4a and the rear pivot links 4b, 4b on the right/left opposed sides.

The pair of right/left rear pivot links 4b, 4b are supported to be vertically pivotable about a transverse axis of a support shaft 4d interconnecting base ends of these links 4b, 4b and the links 4b, 4b extend obliquely downward.

At front right/left ends and rear right/left ends of the mower deck 21, there are mounted erect brackets 17a, 17a, 17b, 17b having unillustrated through holes. Connecting pins 18a pivotally connecting the terminal ends of the front pivot links 4a, 4a to the front ends of the coupling links 4c, 4c are inserted and connected to the unillustrated through holes of the front right/left brackets 17a, 17a. Connecting pins 18b pivotally connecting the terminal ends of the rear pivot links 4b, 4b to the rear ends of the coupling links 4c, 4c are inserted and connected to the unillustrated through holes of the rear right/left brackets 17b, 17b. With these, the mower unit 21 is suspended and supported.

A single-action type cylinder 14 is operably connected to a drive arm 19 projecting from the pivot shaft 4d. In operation, as the lift cylinder 14 is expanded by pressure oil supply thereto, the link mechanism 4 is driven to be elevated relative to the vehicle body frame 3. Whereas, as the lift cylinder 14 is contracted by pressure oil discharge therefrom, the link mechanism 4 is gravity-lowered relative to the vehicle body frame 3.

More particularly, in association with the expanding/contracting operations of the lift cylinder 14, there can be selectively realized a working posture where the mower unit 20 is lowered to place its gauge wheels 25 on the ground surface and a grass mowing operation is carried out, and a non-working posture where the mower unit 20 is lifted up to lift the gauge wheels 25 up off the ground surface and no grass mowing operation is carried out.

When the machine body is caused to travel with setting the mower unit 20 under the working posture, the mower unit 20 effects a mowing operation of grass, lawn or the like with a rotary blade set consisting of three rotary blades disposed side by side inside the mower deck 21, i.e. a first rotary blade 22C disposed at the center, a second rotary blade 22L disposed on the left side and a third rotary blade 22R disposed on the right side, and cut grass pieces or the like will be conveyed inside the mower deck 21 by means of air flow generated in association with rotations of the respective rotary blades 22L, 22C, 22R to a discharge opening 23 provided at the right end of the mower deck 21 to be discharged therethrough to the outside of the traveling machine body.

Figure 3:
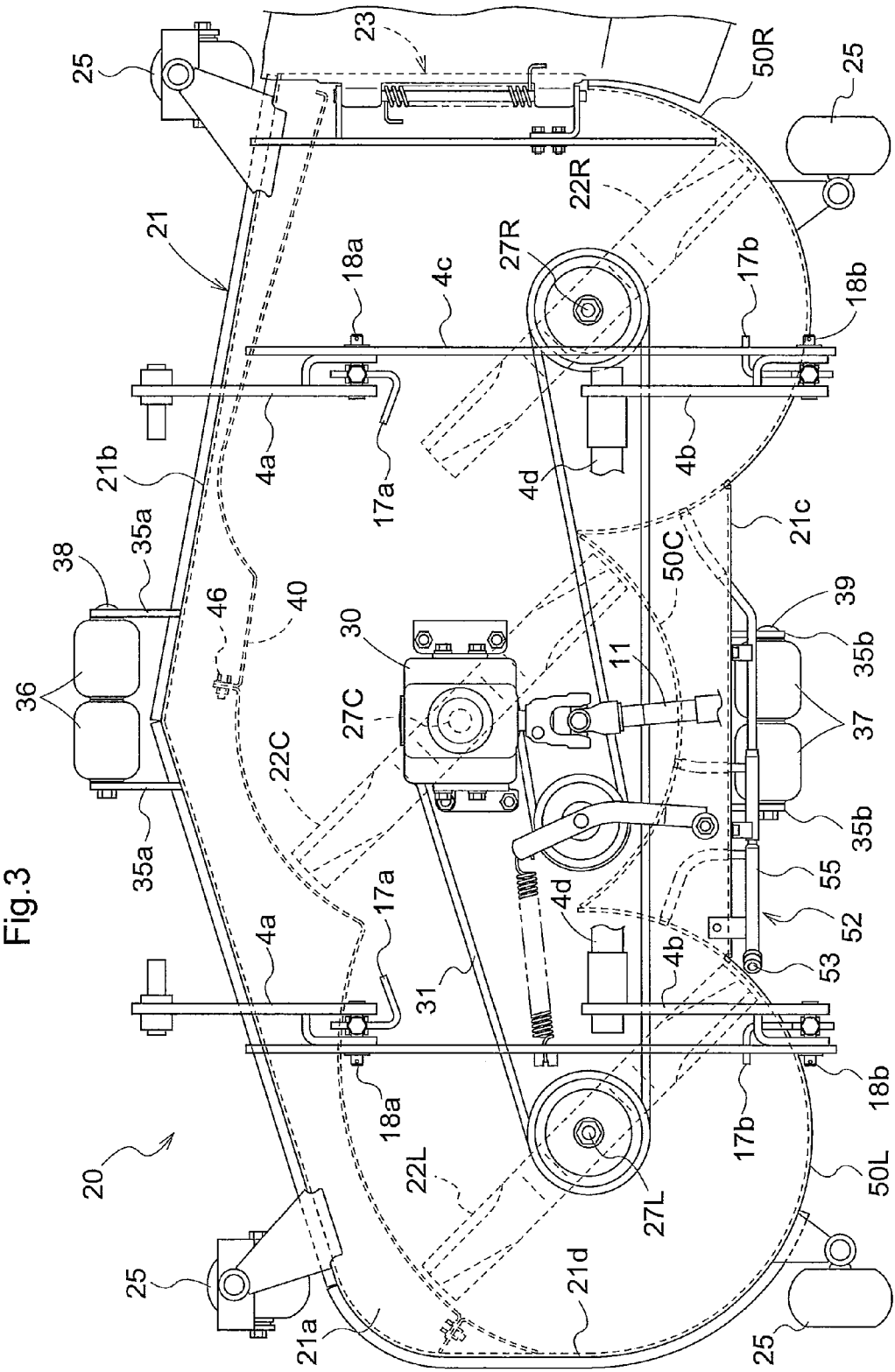
FIG. 3 is a plan view of a mower unit.

As shown in FIG. 3, the mower unit 20 includes pairs of front and rear ground-contacting rollers 36, 36, 37, 37 provided on the front side and rear side at the lateral center of the mower deck 21 in juxtaposition with each other in the transverse direction of the mower deck 21.

The front side right/left ground-contacting rollers 36, 36 are freely rotatably supported via a support shaft 38 to a pair of right/left support members 35a connected to a front side wall 21b of the mower deck 21. When an obstacle such as a bump is present on the ground surface, the pair of front right/left ground-contacting rollers 36, 36 will ride over and pass this obstacle, while supporting and keeping the front end portion of the mower deck 21 on the ground surface so that the front end portion will not bump against this obstacle.

Figure 6:
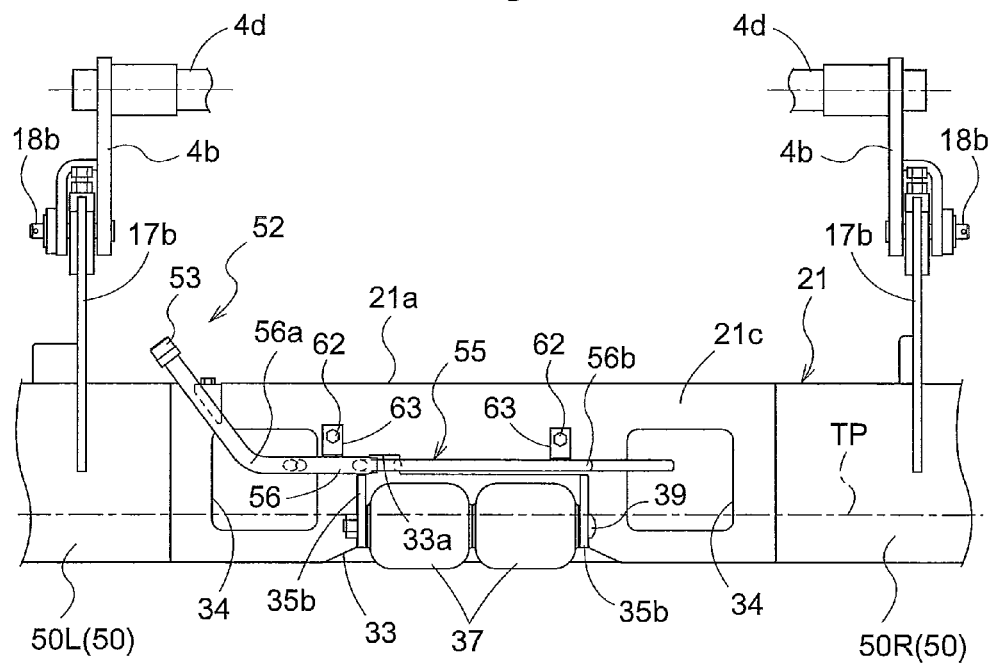
FIG. 6 is a rear view of the mower unit.

The pair of right/left rear ground-contacting rollers 37, 37 are freely rotatably supported via a support shaft 39 to a pair of right/left support members 35b connected to and between a group of auxiliary side walls 50 and a rear side wall 21c at portions of the members projecting rearward from a first air vent 33 (see FIG. 6). When an obstacle such as a bump is present on the ground surface, the pair of rear right/left ground-contacting rollers 37, 37 will ride over and pass this obstacle, while supporting and keeping the rear end portion of the mower deck 21 on the ground surface so that the rear end portion will not bump against this obstacle. These right/left ground-contacting rollers 37, 37 are supported and arranged in such a manner that the entire rollers 37, 37 project rearward from the first air vent 33 so as to minimize interference with air communication of the first air vent 33.

[Mower Unit]

Figure 4:
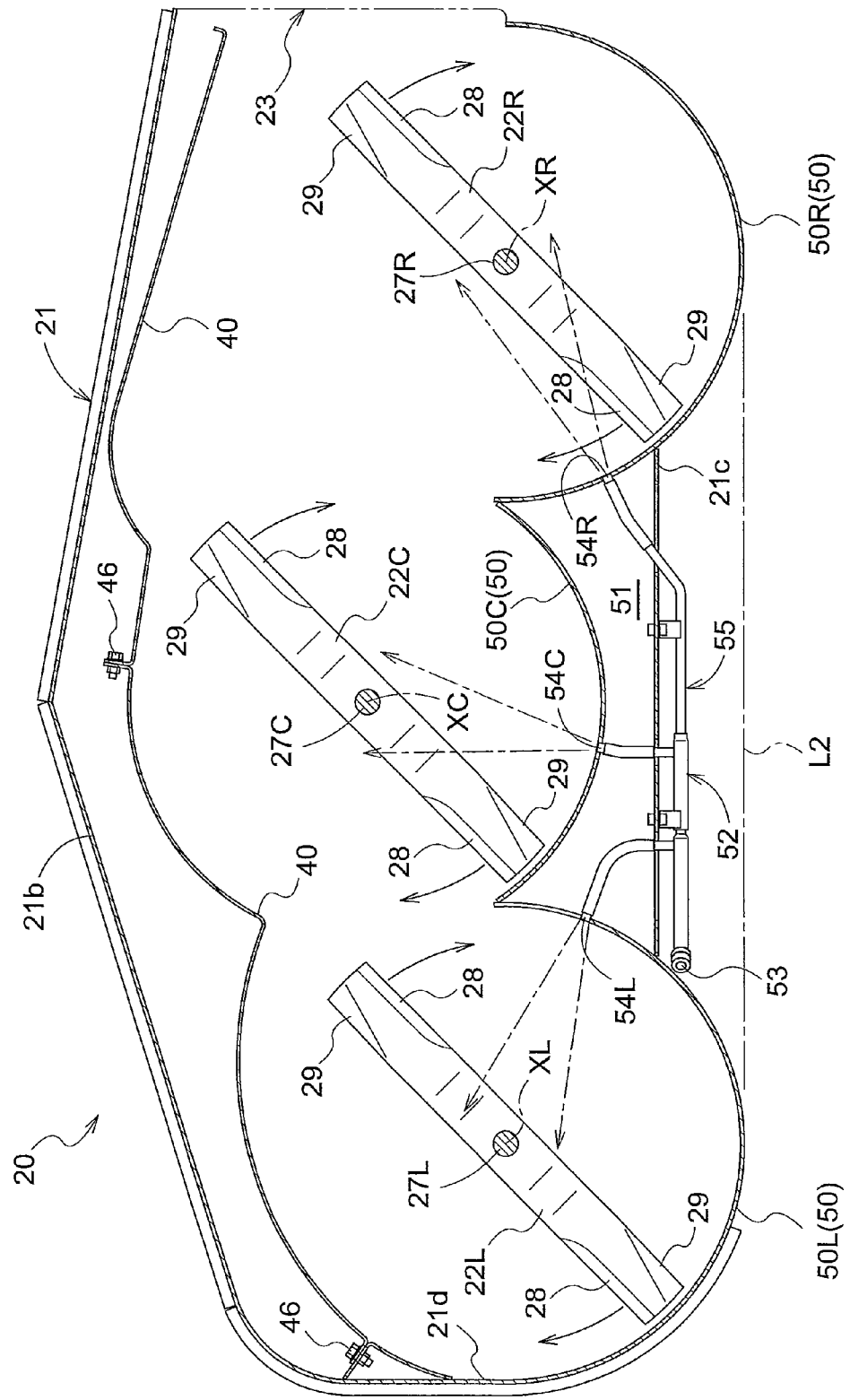
FIG. 4 is a plan view in cross section of the mower unit.

As shown in FIG. 3 and FIG. 4, the mower unit 20 includes the mower deck 21, the rotary blade set consisting of the three rotary blades 22R, 22C, 22L mounted inside the deck, and the gauge wheels 25. On an inner side of the mower deck 21, there are provided a baffle plate 40 extending along the perpendicular direction on the front side of the rotary blade set (the forward traveling side of the machine body is defined as the "front side" and the reverse traveling side of the same is defined as the "rear side"), and a group of three auxiliary side walls 50 extending along the perpendicular direction on the rear side of the rotary blade set, namely, a first auxiliary side wall 50C located at the center, a second auxiliary side wall 50L located on the left side, and a third auxiliary side wall 50R located on the right side. The first auxiliary side wall 50C is a quarter-arc plate extending along the rear portion of the rotary path of the first rotary blade 22C, and hence, when appropriate, this will be referred to also as a first arc plate (or simply an arc plate when no special distinction is needed). The second auxiliary side wall 50L is a half-arc plate extending along the rear portion of the rotary path of the second rotary blade 22L, and hence, when appropriate, this will be referred to also as a second arc plate (or simply an arc plate when no special distinction is needed). The third auxiliary side wall 50R is a half-arc plate extending along the rear portion of the rotary path of the third rotary blade 22R, and hence, when appropriate, this will be referred to also as a third arc plate (or simply an arc plate when no special distinction is needed). In this embodiment, the first, second and third arc plates 50C, 50L, 50R are formed coaxial respectively with the vertical axes XC, XL, XR of the rotary blades 22C, 22L, 22R. Substantially rearwardly of the first auxiliary side wall 50C, there is foamed a mower deck rear space 51 delimited by outer faces of the first, second and third arc plates 50C, 50L, 50R and formed recessed in a plan view. Further, the discharge opening 23 formed in the right end area of the mower deck 21 is delimited by the right end of a top wall 21a, the right end of the front side wall 21b and the right end of the third arc plate 50R of the auxiliary side walls 50.

The mower deck 21 is comprised of the top wall 21a, the front side wall 21b extending from the front edge of the top wall 21a and downwardly of the deck 21, a rear side wall 21c extending from the rear edge of the top wall 21a and downwardly of the deck 21, and a left side wall 21d extending from the lateral end of the top wall 21a and downwardly of the mower deck 21, and thus the mower deck 21 is formed like a vessel opened to the side of the ground surface.

The rear side wall 21c (vertical wall) is provided rearwardly of the first arc plate 50C, with the wall 21c being connected to the left second and right third arc plates 50L, 50R of the auxiliary side walls 50 and this rear side wall 21c defines the first air vent 33 at the center portion and defines also second air vents 34, 34 on the opposed sides across the first air vent 33 (see FIG. 6).

As shown in FIGS. 3 and 4, the first, second and third rotary blades 22C, 22L, 22R are disposed side by side inside the mower deck 21. Incidentally, these rotary blades are arranged in a triangular layout in the plan view such that, of the first, second and third rotary blades 22C, 22L, 22R, the first rotary blade 22C located at the center in the transverse direction of the mower deck 21 is slightly offset forwardly. The second rotary blade 22L is disposed most distantly from the discharge opening 23 and most upstream in the cut grass flowing direction. The third rotary blade 22R is disposed closest to the discharge opening 23 and most downstream in the cut grass flowing direction.

The rotary blades 22C, 22L, 22R are rotatably supported to lower ends of respective drive shafts 27C, 27L, 27R, which drive shafts 27C, 27L, 27R are rotatably supported to the top wall 21a of the mower deck 21 via an unillustrated support member comprising a bearing support case. Whereby, the rotary blades 22R, 22C, 22L are rotatably driven about the vertical axes XR, XC, XL each extending in the vertical direction of the mower deck 1, together with the drive shafts 27L, 27C, 27R, respectively. Incidentally, each one of the rotary blades 22R, 22C, 22L includes cutter blades 28 provided at its opposed ends and wind-generating blades 29 disposed rearwardly of the respective cutter blades 28.

The baffle plate 40 is connected to the mower deck 21 via unillustrated attaching members connected to a plurality of portions of the baffle plate 40 along the longitudinal direction thereof. The baffle plate 40 is comprised of two split band plates disposed side by side along the longitudinal direction of the baffle plate 40 and interconnected via connecting bolts 46.

The drive force from the engine 5 is transmitted through the rotary shaft 11 to the rotary blade driving mechanism 30. This drive force transmitted to the rotary blade driving mechanism 30 drives the drive shaft 27C of the rotary blade 22C and drives also, via a belt 31 entrained around the three drive shafts 27L, 27C, 27R, the drive shafts 27R, 27L of the respective rotary blades 22R, 22L. With this, the respective rotary blades 22R, 22C, 22L are driven to rotate about the respective vertical axes XR, XC, XR, as indicated by arrows in FIG. 4.

Cut grass pieces cut by the rotary blades 22R, 22C, 22L are guided to the auxiliary side walls 50 and the baffle plate 40 by the air flow generated by the wind-generating blades 29 of the respective rotary blades 22R, 22C, 22L, and conveyed to one lateral side inside the mower deck 21 where the discharge opening 23 is provided, and then discharged through this discharge opening 23 to the lateral outer side of the mower deck 21.

[Washing Device]

Figure 5:
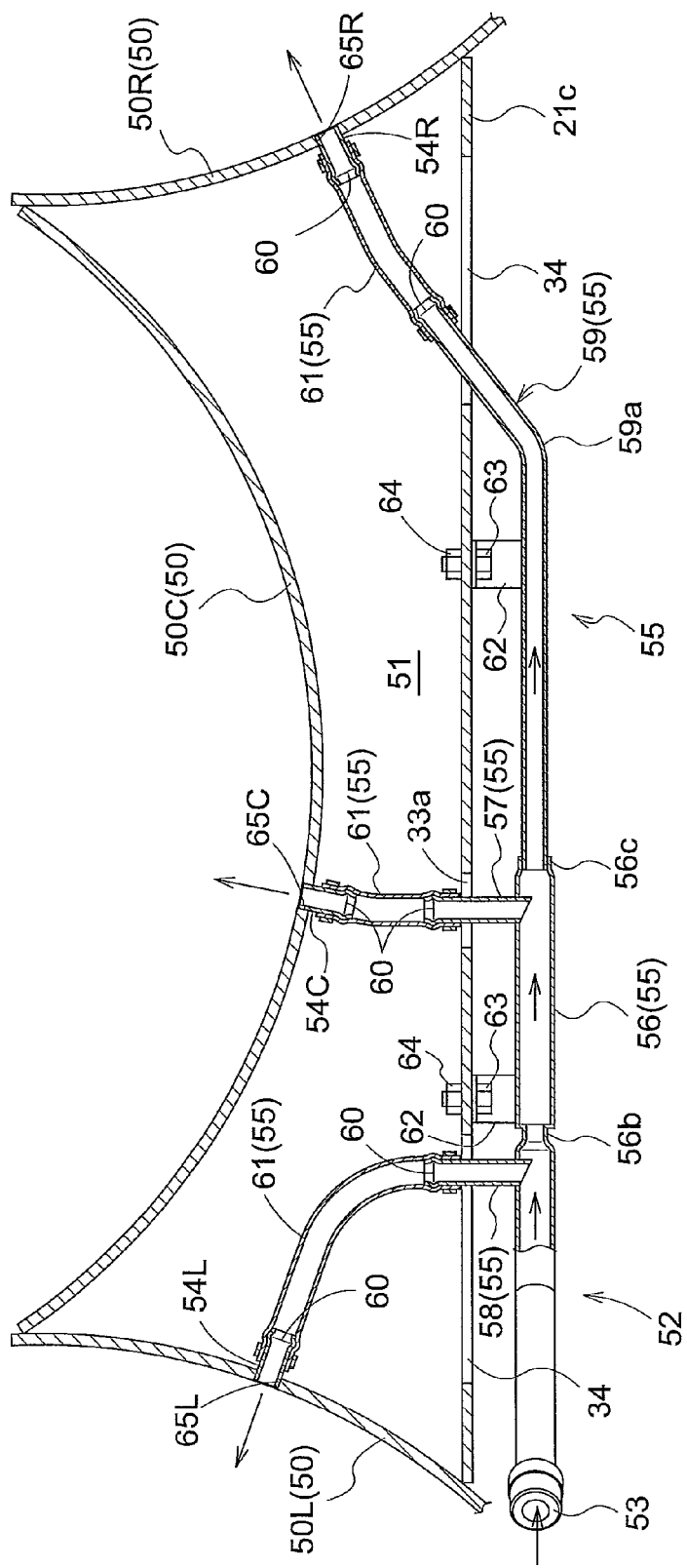
FIG. 5 is a plan view in cross section of a washing device.

As shown in FIG. 4 and FIG. 5, a washing device 52 includes: a single water supplying unit 53 for supplying washing water; first, second and third water discharging units 54C, 54L, 54R for discharging the washing water respectively to the first, second and third rotary blades 22C, 22L, 22R; and a water supplying pipe unit 55 connected to and between these water discharging units 54C, 54L, 54R and the water supplying unit 53.

As shown in FIGS. 1-3, FIG. 7A and FIG. 7B, the water supplying unit 53 is supported to the water supplying pipe unit 55. The water supplying unit 53 is disposed at a position between the top wall 21a of the mower deck 21 and the driving section floor 16 as seen in the side view, and also on the right/left center side of the machine body relative to an extension line L1 of a lateral outer end portion of a rear wheel fender 15 as seen in the plan view.

Figure 7A:
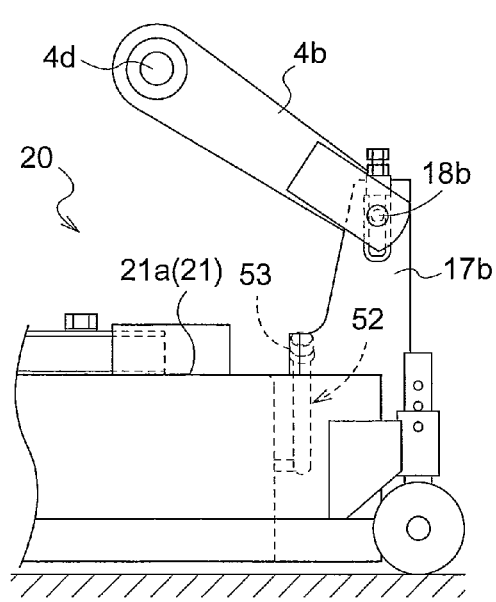
FIG. 7A is a side view showing a portion of the mower unit adjacent a pivot arm when the mower unit is set under a working posture.
Figure 7B:
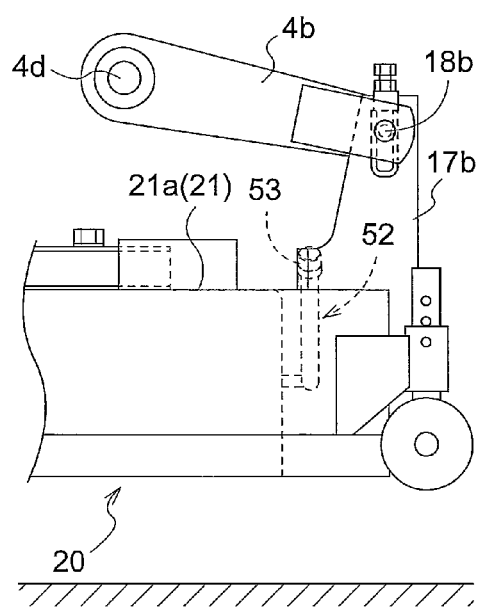
FIG. 7B is a side view showing the portion of the mower unit adjacent the pivot arm when the mower unit is set under a non-working posture.

Further, as shown in FIG. 7A and FIG. 7B, the water supplying unit 53 is provided at such position as is present between the top wall 21a of the mower deck 21 and the rear pivot link 4b as seen in the side view and as is concealed on the right/left side of the machine body of the bracket 17b provided at a rear portion of the mower deck 21.

As shown in FIG. 4 and FIG. 5, the water supplying unit 55 includes: a main water supplying pipe 56 communicating the water supplying unit 53 to the third water discharging unit 54R; a first auxiliary water supplying pipe 57 for supplying washing water from the main water supplying pipe 56 to the first water discharging unit 54C; a second auxiliary water supplying pipe 58 for supplying the washing water to the second water discharging unit 54L; and a third auxiliary water supplying pipe 59 for supplying the washing water to the third water discharging unit 54R. Each auxiliary water supplying pipe 57, 58, 59 includes a flexible hose portion 61 having flexibility, such as a rubber hose, a vinyl hose, etc. As may be apparent from FIG. 4, the water supplying pipe unit 55 is disposed within the mower deck rear space (recessed space) 51 as described above, and its main water supplying pipe 56 is supported to the rear side wall 21C via stays 62, bolts 63 and nuts 64. As shown in FIG. 4, the water supplying pipe unit 55 is disposed forwardly of an imaginary line L2 interconnecting rear ends of the two, second and third arc plates 50L, 50R of the auxiliary side walls 50 as seen from above.

As shown in FIG. 6, the water supplying pipe unit 55, except for a portion thereof on the side of the water supplying unit 53, is disposed between the top wall 21a of the mower deck 21 and the lower end of the mower deck 21, and in this embodiment, at the substantially midpoint therebetween.

As shown in FIG. 6, the main water supplying pipe 56 first extends from the water supplying unit 53, obliquely downward and laterally inward, and then is bent at a first bent portion 56a adjacent the midpoint between the top wall 21a of the mower deck 21 and the lower end of the mower deck 21 to extend horizontally therefrom above the support member 35b. Then, as shown in FIG. 5, the leading end of the pipe 56 is bent at a second bent portion 59a to extend into the right second air vent 34.

The main water supplying pipe 56 includes, downstream of its each branching portion to the first and second auxiliary water supplying pipes 57, 58, reduced diameter portions 56b, 56c each having a smaller diameter than the inner diameter of the upstream side of its branching portion. The shape and dimension of the water supplying unit are determined such that the flow rates and pressures of the washing water discharged from the first, second and third water discharging units 54C, 54L, 54R may be substantially equal to one another. The formation of these reduced diameter portions 56b, 56c is one example for realizing this.

The second auxiliary water supplying pipe 58 is branched at a position slightly downstream of the first bent portion 56a to extend into the left second air vent 34, and the first auxiliary water supplying pipe 57 located downstream of the second auxiliary water supplying pipe 58 extends into a cutout 33a provided at the upper side of the first air vent 33.

The first, second and third water discharging units 54C, 54L, 54R are engaged and fitted within first, second and third through holes 65C, 65L, 65R formed in the arc plates 50C, 50L, 50R, respectively, and are disposed upwardly of a plane including the rotary paths of the first, second and third rotary blades 22C, 22L, 22R. Incidentally, the third through hole 65R is formed slightly on the connecting portion side of the mid point between the left end of the third arc plate 50R and the portion interconnecting the third arc plate 50R and the rear side wall 21c. The first through hole 65C is formed slightly on the left side of the right/left center of the first arc plate 50C. The second through hole 65L is formed adjacent the midpoint between the right end of the second arc plate 50L and the portion interconnecting the second art plate 50L and the rear side wall 21c.

The first, second and third water discharging units 54C, 54L, 54R are connected to leading end portions of the first auxiliary water supplying pipe 57, second auxiliary water supplying pipe 58 and third auxiliary water supplying pipe 59 via the flexible hose portions 61, respectively. Incidentally, at a base end each of the water discharging units 54 and at a leading end each of the first auxiliary water supplying pipe 57, second auxiliary water supplying pipe 58 and third auxiliary water supplying pipe 59, increased diameter portions 60 are formed for preventing inadvertent detachment of the flexible hose portions 61 associated therewith.

As shown in FIG. 4, washing water supplied to the water supplying section 53 by e.g. connecting an unillustrated hose from a water tap to this water supplying unit 53 will flow through the main water supplying pipe 56 and the first auxiliary water supplying pipe 57, second auxiliary water supplying pipe 58 and third auxiliary water supplying pipe 59 to be supplied respectively to the first, second and third water discharging units 54C, 54L, 54R, so that the water is discharged against the rotary blades 22C, 22L, 22R from lateral sides of these rotary blades 22C, 22L, 22R. When the washing water is discharged to the rotary drive shafts 27C, 27L, 27R ("drive shafts" hereinafter) of the respective rotary blades 22C, 22L; 22R while these rotary blades 22C, 22L, 22R are being rotated, cut grass pieces entangled around the drive shafts 27C, 27L, 27R, or cut grass pieces adhering to the inner face of the mower deck 21 can be removed in an efficient manner.

Further, the first, second and third water discharging units 54C, 54L, 54R are disposed upwardly of a plane TP each of the rotary paths of the rotary blades 22C, 22L, 22R corresponding respectively thereto, that is, closer to the top wall 21a than the plane TP. Further, the first water discharging unit 54C is designed to focus on the drive shaft 27C of the first rotary blade 22C and adjusted in position such that at least a portion of the washing water discharged therefrom has a flow direction vector in opposition to the rotational direction vector of the first rotary blade 22C. With this, at least a portion of the washing water flow discharged from the first water discharging unit 54C is caused to collide against the first rotary blade 22C moving in opposition thereto, so that with utilizing this collision energy, cut grass pieces, mud or the like stuck between the attaching root of the first rotary blade 22C and the drive shaft 27C is removed. To the same end, the second water discharging unit 54L is designed to focus on the drive shaft 27L of the second rotary blade 22L and adjusted in position such that at least a portion of the washing water discharged therefrom has a flow direction vector in opposition to the rotational direction vector of the second rotary blade 22L; and the third water discharging unit 54R is designed to focus on the drive shaft 27R of the third rotary blade 22R and adjusted in position such that at least a portion of the washing water discharged therefrom has a flow direction vector in opposition to the rotational direction vector of the third rotary blade 22R.

The distance between the rear pivot link 4b and the water supplying unit 53 when the mower 20 is lowered to the working posture to effect a grass mowing operation as shown in FIG. 7A is greater than the distance between the same when the mower unit 20 is elevated to the non-working posture not to effect any grass mowing operation as shown in FIG. 7B. Therefore, when the mower unit 20 is lowered to the working posture, it becomes easier to connect a water supplying hose (not sown) or the like to the water supplying unit 53 and the above arrangement also serves to notify the worker that the washing operation is to be effected when the mower is set under the working posture. Hence, the arrangement serves to avoid the possibility of the washing water being scattered about when the washing operation is effected erroneously under the non-working posture with the mower unit 20 being at the elevated position.

Figure 8:
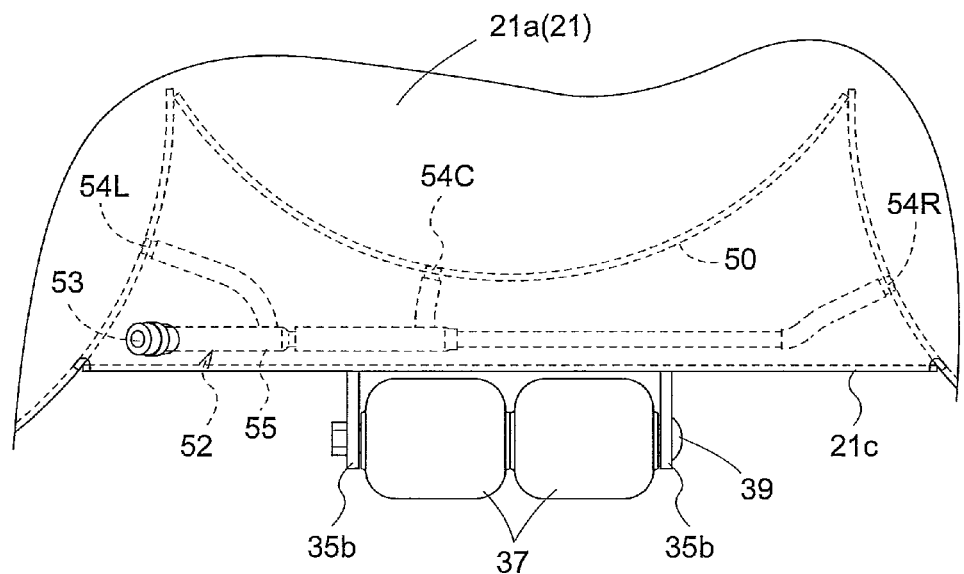
FIG. 8 is a plan view of a washing device relating to a further embodiment.

Other Embodiments (1) As shown in FIG. 8, the washing device 52, except for its water supplying unit 53, may be disposed within the mower deck rear space (recessed space) 51 having the lateral perimeter thereof delimited by the first auxiliary side wall 50C, the left second auxiliary side wall 50L, the right third auxiliary side wall 50R and the rear side wall 21c.

Figure 9:
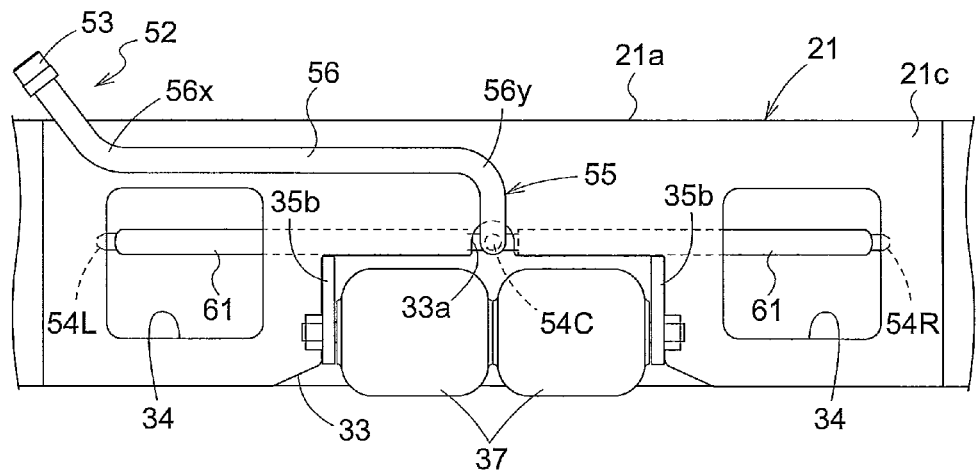
FIG. 9 is a rear view of a mower unit relating to a still further embodiment.

(2) The washing device 52 in the foregoing embodiment may be constructed alternatively as shown in FIGS. 9-11. In this embodiment, the water supplying pipe unit 55 includes a main water supplying pipe 56 communicating between the water supplying unit 53 and the first water discharging unit 54C, and a second auxiliary water supplying pipe 58 and a third auxiliary water supplying pipe 59 that branch from the main water supplying pipe 56 in right/left symmetry and communicate respectively to the second water discharging unit 54L and the third water discharging unit 54R. In this, the first auxiliary water supplying pipe 57 is used also as the main water supplying pipe 56.

The main water supplying pipe 56 extends obliquely downward and laterally inward from the water supplying unit 53 and then is bent at a first bent portion 56x adjacent the top wall 21a of the mower deck 21 to extend horizontally therefrom, and then is bent downward at a second bent portion 56y adjacent the right/left center of the mower deck 21 and then its leading end portion is bent forward at a third bent portion 56z to extend into a cutout 33a provided at the right/left center of the upper side of the first air vent 33.

The first, second and third water discharging units 54C, 54L, 54R are engaged and fitted within first, second and third through hole 65C, 65L, 65R formed in arc plates 50C, 50L, 50R, respectively. The through hole 65R is formed adjacent the midpoint between the left end of the third arc plate 50R and the portion interconnecting the third arc plate 50R and the rear side wall 21c. The through hole 65C is formed adjacent the right/left center of the first arc plate 50C. The through hole 65L is formed adjacent the midpoint between the right end of the second arc plate 50L and the portion interconnecting the second arc plate 50L and the rear side wall 21c. Further, in this embodiment, as shown in FIG. 11, the leading ends of the first, second and third water discharging units 54C, 54L, 54R are tapered for improving the discharging ability for washing water. Also, as shown in FIG. 12, the shape of each of these water discharging units 54C, 54L, 54R may be formed as a double-cylinder construction having its inner cylinder 70 fixed within its outer cylinder 71 via a flange 72.

(3) The water supplying unit 53 in the foregoing embodiment may be disposed with an offset as seen in the plan view, toward the right/left center of the machine body relative to the extension line L1 of the lateral outer end portion of the rear wheel fender 15, and outwardly of the lateral outer end of the driving section floor 16. Further, for facilitating the connection of the water supplying hose or the like, the water supplying unit 53 may be disposed with an offset toward right/left outer side of the machine body relative to the extension line L1 of the lateral outer end portion of the rear wheel fender 15 as seen in the plan view.

(4) The water supplying unit 53 of the washing device 52 in the foregoing embodiment may be supported to the rear side wall 21c on the front side of this rear side wall 21c to be connected to the water supplying unit 53, so that the water supplying unit 53 extends through an opening such as the second air vent 34 defined in the rear side wall 21c to the rear side of the rear side wall 21c.

(5) In the foregoing embodiment, there are provided the auxiliary side walls 50 and the rear side wall 21c. In the case of an arrangement lacking the rear side wall 21c, the water supplying pipe unit 55 of the washing device 52 may be supported to the auxiliary side walls 50 to be connected to the water supplying unit 53 provided on the auxiliary side walls 50. Also, in the case of an arrangement lacking the auxiliary side walls 50, the water supplying pipe unit 55 of the washing device 52 may be supported to the rear side wall 21c to be connected to the water supplying unit 53 provided on this rear side wall 21c.

(6) The washing device 52 in the foregoing embodiment may be provided at a position other than the mower deck rear space (recessed space) 51 of the auxiliary side walls 50, e.g. a space formed on the front side of the front side wall 21b or between the front side wall 21b and the baffle plate 40 or on the upper side of the baffle plate 40. Specifically, in case the washing device 52 is disposed on the front side of the front side wall 21b, the water supplying unit 55 supported to the front face of the front side wall 21b may be connected to the water supplying unit 53 provided in the baffle plate 40, via the flexible hose portion 61 disposed in a space formed between the front side wall 21b and the baffle plate 40. For another instance, in case the washing device 52 is disposed in a space formed between the front side wall 21b and the baffle plate 40, the water supplying pipe unit 55 disposed in the space formed between the front side wall 21b and the baffle plate 40 may be connected to the water supplying unit 53 provided in the baffle plate 40, and also the water supplying unit 53 may be caused to extend to the front side of the front side wall 21b through an opening defined in the front side wall 21b. For still another instance, in case the washing device 52 is disposed on the upper side of the top wall 21a, the water supplying pipe unit 55 supported on the upper side of the top wall 21a may be connected to the water supplying unit 53 provided on the upper side of the top wall 21a.

(7) In the foregoing embodiment, there was illustrated the mower deck 21 defining the mower deck rear space (recessed space) 51. However, the invention may be applied equally to a mower deck not defining the mower deck rear space (recessed space) 51 and having a rear skirt extending straight in the right/left direction instead. In this case, the water supplying pipe unit 55 of the washing device 52 may be supported to the rear skirt and connected to the water supplying unit 53 provided on the rear skirt.

(8) The water supplying unit 53 of the washing device 52 in the foregoing embodiment may be disposed not on the left side of the machine body, but on the right side of the same.

The present invention is not limited to the construction where the mower unit is configured as the side-discharge type, but may be applied to the construction where the unit is configured as the mulching type or the rear-discharge type.

What is claimed is:
1. A mower unit to be suspended from a machine body of a grass mower, the mower unit comprising:
a mower deck mounting therein in parallel layout first, second and third rotary blades rotatably driven about vertical axes, said mower deck including:
a top wall,
side walls, and
first, second and third auxiliary side walls, each of the auxiliary side walls having a shape thereof extending along at least a rear portion of a rotary path of the rotary blade associated therewith, wherein the top wall, the side walls and the first, second, and third auxiliary side walls define an enclosure space for housing the first, second, and third rotary blades, respectively; and a washing device including:
- a single water supplying unit disposed upwardly of the top wall for supplying washing water,
- first water discharging unit disposed through said first auxiliary side wall for discharging water to said enclosure space,
- a second water discharging unit disposed through said second auxiliary side wall for discharging water to said enclosure space,
- a third water discharging unit disposed through said third auxiliary side wall for discharging water to said enclosure space, and
- a water supplying pipe unit interconnecting and communicating the water supplying unit to the first, second and third water discharging units, said water supplying pipe unit being disposed within a mower deck rear space delimited by outer faces of said first, second and third auxiliary side walls;

wherein said first, second and third water discharging units are configured to discharge the washing water in such a manner that a center flow portion of the discharged water respectively therefrom is confined within said enclosure space of the mower deck;

wherein said first rotary blade is disposed between said second rotary blade and said third rotary blade;

a rotation center of said first rotary blade is located more forwardly of the machine body than rotation centers of said second rotary blade and said third rotary blade; and said mower deck rear space is formed rearwardly of said first auxiliary side wall; and wherein rearwardly of said first auxiliary side wall, there is provided a rear side wall interconnecting said second auxiliary side wall and said third auxiliary side wall, and said washing device is supported by said rear side wall.

2. The mower unit according to claim 1, wherein each of said first, second and third water discharging units is disposed upwardly of the rotary path of the rotary blade associated therewith.

3. The mower unit according to claim 1, wherein:
said first water discharging unit is configured to focus on a drive shaft for the first rotary blade and at least a portion of washing water discharged therefrom has a flow direction vector opposed to a rotation direction vector of the first rotary blade;
said second water discharging unit is configured to focus on a drive shaft for the second rotary blade and at least a portion of washing water discharged therefrom has a flow direction vector opposed to a rotation direction vector of the second rotary blade; and
said third water discharging unit is configured to focus on a drive shaft for the third rotary blade and at least a portion of washing water discharged therefrom has a flow direction vector opposed to a rotation direction vector of the third rotary blade.

4. The mower unit according to claim 1, wherein:
said mower deck is suspended and supported from the machine body to be liftable up/down via at least one pivot arm; and
said water supplying unit is disposed between a top wall of the mower deck and the pivot arm.

5. The mower unit according to claim 1, wherein:
said water supplying pipe unit includes a main water supplying pipe connected to the water supplying unit, a first auxiliary water supplying pipe for connecting the main water supplying pipe to the first water discharging unit, a second auxiliary water supplying pipe for connecting the main water supplying pipe to the second water discharging unit, and a third auxiliary water supplying pipe for connecting the main water supplying pipe to the third water discharging unit; and
the water supplying unit is shaped and dimensioned such that flow rates and pressures of the washing water from the first, second and third water discharging units are substantially equal to one another.

6. The mower unit according to claim 5, wherein at least a portion each of said auxiliary water supplying pipes is formed of a flexible hose portion.

* * * * *

UNITED STATES PATENT AND TRADEMARK OFFICE
CERTIFICATE OF CORRECTION

| | |
|---|---|
| PATENT NO. | : 8,087,221 B2 |
| APPLICATION NO. | : 12/872002 |
| DATED | : January 3, 2012 |
| INVENTOR(S) | : Akihito Sugio et al. |

Page 1 of 1

It is certified that error appears in the above-identified patent and that said Letters Patent is hereby corrected as shown below:

Column 11, Line 4, Claim 1, before "first water" insert -- a --

Signed and Sealed this
Twenty-seventh Day of March, 2012

David J. Kappos
*Director of the United States Patent and Trademark Office*